D. L. MILLIKEN & O. M. PILLSBURY.

H. M. PILLSBURY, Executrix of O. M. PILLSBURY, dec'd., assignors to E. H. HAZELTON.

Joint for Stove-Pipe.

No. 8,356. Reissued July 30, 1878.

WITNESSES

Villette Anderson.

F. J. Masi.

INVENTORS

Daniel L. Milliken -

Hannah M. Pillsbury -

Executrix of O. M. Pillsbury - by E. W. Anderson

ATTORNEY

UNITED STATES PATENT OFFICE

DANIEL L. MILLIKEN, OF BOSTON, MASS., AND HANNAH M. PILLSBURY, OF CLAREMONT, N. H., EXECUTRIX OF OLIVER M. PILLSBURY, DECEASED, ASSIGNORS TO EDMUND H. HAZELTON, OF CHICAGO, ILL.

IMPROVEMENT IN JOINTS FOR STOVE-PIPES.

Specification forming part of Letters Patent No. 64,552, dated May 7, 1867; Reissue No. 8,356, dated July 30, 1878; application filed June 15, 1878.

*To all whom it may concern:*

Be it known that DANIEL L. MILLIKEN, of Boston, State of Massachusetts, and O. M. PILLSBURY, late of Claremont, in the county of Sullivan and State of New Hampshire, did invent certain new and useful Improvements in Joints for Stove-Pipes; and we do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
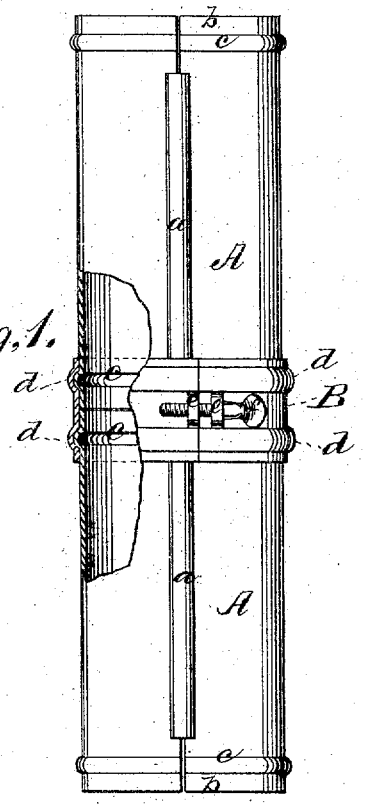
Figure 2:
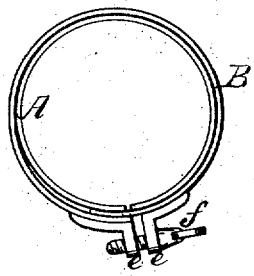

Figure 1 of the drawings is an external view of the sections of a stove-pipe connected together by this invention; and Fig. 2 is a transverse section of the same, taken through the line *x x*, Fig. 1.

This invention has relation to improved means for securing together the sections of stove-pipes, whereby the latter may be readily put up and taken down, and the sections or lengths firmly connected together, so as to obtain very close or tight joints, and thus prevent the escape of either fire or smoke.

The nature of the invention consists in an adjustable band fitting over the joint of two adjoining sections of pipe, and having a draw-fastening, whereby its ends are drawn together and fastened.

It also consists in combining, with the jointed sections of a pipe, having each a circumferential bead near its end, a band provided with circumferential grooves adapted to receive the said beads, and adjustably secured around the said joint, all as hereinafter shown and described.

In the annexed drawings, the letters A A designate two lengths or sections of a stove-pipe, constructed as usual, with the exception that the lapped or lock joints *a* do not extend the whole length of the sections, a space, *b*, being left at each end, where the edges of the sheet metal simply abut against each other, as shown in Fig. 1.

The sections A are swaged or grooved circumferentially, so as to form a bead, *c*, around them, one near each end, as shown in Fig. 1. B represents a collar or band, which may be constructed of sheet metal of the same kind as that of which the sections A are made. This band or collar is also circumferentially swaged or grooved, to form two beads, *d d*, which project from the exterior surface of the band or collar, and form grooves at the inner side thereof. The collar or band does not have its end permanently attached, but is provided near each end with a projecting ear or lug, *e*, through which a screw, *f*, passes, and by turning which the collar or band may be drawn snugly around the ends of the adjoining sections A A, the collar or band fitting over the portions of the ends *b* of the sections, so that the lap or lock joint *a* will not interfere with it, and the beads *c* of the sections fitting in the grooves in the inner side of the collar formed by the beads *d*. By turning the screw *f* the ends of the band are drawn toward each other and tightened around the pipe, and when this tightening is completed no further operation is required to secure the band, this being also accomplished by the screw or draw fastening. By this simple means the sections A A are made to form with each other a very close and rigid joint, which will effectually prevent the escape of either smoke or fire, and which cannot become casually disconnected.

We claim as new, and desire to secure by Letters Patent, the following:

1. The combination, with adjoining sections of a stove-pipe, of a band clamped around the joint of said sections, and having the end lugs, *e e*, and adjusting-screw *f*, adapted to draw said lugs toward each other, substantially as specified.

2. The combination, with the adjoining sections of a stove-pipe, of a clamp-band and draw-fastening, which tightens the band around the sections, and secures it at one and the same operation, substantially as specified.

3. The adjustable band B, provided with circumferential grooves *b*, fitting over the corresponding beads *c*, near the ends of the sections A of a pipe, as herein shown, and substantially as described.

4. The combination, with the sections A of a pipe, having each a bead, *c*, near its end, of a band, B, having corresponding groove *b*, adapted to receive said beads, and clamped around the joint of the said sections, substantially as set forth.

In testimony that we claim the foregoing we have hereunto set our hands this 25th day of May, 1878.

DAN. L. MILLIKEN.
HANNAH M. PILLSBURY,
*Executrix of the last will and testament of Oliver M. Pillsbury, deceased.*

Witnesses:
H. W. PARKER,
MOTT A. CUMMINGS